United States Patent [19]

Gottschling et al.

[11] Patent Number: 4,963,796
[45] Date of Patent: Oct. 16, 1990

[54] HIGH-PRESSURE SODIUM VAPOR LAMP

[75] Inventors: Wolfgang Gottschling; Klaus Guenther, both of Berlin; Hans-Georg Kloss, Hohen-Neuendorf; Rainer Radtke, Berlin; Felix Serick, Neuenhagen, all of Fed. Rep. of Germany

[73] Assignee: Kombinat VEB Narva, Berlin, Fed. Rep. of Germany

[21] Appl. No.: 316,386

[22] Filed: Feb. 27, 1989

[30] Foreign Application Priority Data

Mar. 25, 1988 [DD] German Democratic Rep. .................... 3140295

[51] Int. Cl.$^5$ ............................................. H05B 41/30
[52] U.S. Cl. .................................... 315/246; 315/326; 315/358; 313/638

[58] Field of Search ............... 315/246, 287, 291, 302, 315/326, 358; 313/638, 639, 640, 641, 642

[56] References Cited

U.S. PATENT DOCUMENTS 4,884,009 11/1989 Rothwell, Jr. et al. ............ 315/246

Primary Examiner—David Mis
Attorney, Agent, or Firm—Jordan and Hamburg

[57] ABSTRACT

A high-pressure sodium vapor lamp with elevated color temperature, high light yield and improved color rendering properties for general illumination purposes uses sodium or sodium amalgam with mole fractions $x_{Na} > 0.9$ as the arc media. The lamp power supply supplies pulses with a duty cycle $\Gamma$ of $0.01 > \Gamma > 0.1$ with alternating polarity, or with mole fractions $x_{Na} > 0.95$ even at uniform polarity, respectively.

16 Claims, 2 Drawing Sheets

HIGH-PRESSURE SODIUM VAPOR LAMP

FIELD OF THE INVENTION

The invention relates to a high-pressure sodium vapor lamp of increased color temperature, high light yield and improved color rendering, which can be used for general illumination purposes, such as street lighting, object lighting or interior lighting.

BACKGROUND OF THE INVENTION

The spectral distribution of conventional high-pressure sodium vapor lamps has concentrated radiation in the area of the greatly broadened and self-reversed main resonance lines. Since this spectral range is close to the maximum eye sensitivity, such lamps have very high light yields, for which, depending on the electrical power, values between 75 lm/W for 35-watt lamps and 150 lm/W for 1000-watt lamps are obtained. Unfortunately, the color temperature ($T_c$) of approximately 2000 K and the general color rendering index ($R_a$) of about 20 are comparatively low, so that such lamps cannot be used for more demanding lighting applications.

Numerous attempts have been made in the past to improve the color properties of high-pressure sodium vapor lamps by structural techniques or by changing the system of operation. Some such attempts increase the temperature of the cold spot in the burner in order to obtain a better spectral distribution for color quality at a higher sodium partial pressure. The improvements achieved are indicated to be $R_a$ values up to 80 and color temperatures up to 2500° K., but they entail a reduction of the light yield by as much as 40% and a sometimes drastic reduction of useful life (see, for example, J.A.J.M. van Vliet, J.J. de Groot; High-pressure sodium discharge lamps, IEE Proc. 128 (1981) 41). Even the use of red-absorbing filter glasses (DE 2 711 733) only partially helps these deficiencies, since the raising of the color temperature that is achieved entails great light yield losses.

Other attempts to supplement the radiant content lacking in the blue-green range of conventional high-pressure sodium vapor lamps by expanding the luminous system have been described in older patents (U.S. Pat. No. 3,521,108, GB 1,192,094, GB 1,280,370). In these references the addition of thallium, cadmium, zinc or lead or combinations of these elements has been proposed, and yet these efforts have not resulted in a commercially salable lamp. The reasons for this are to be seen, for one thing, in the plasma temperatures typical of such lamps, which with axis levels of about 4000° K. offer only very unfavorable conditions for the excitation of radiation processes at higher energy levels. Occasionally, too, high-pressure sodium vapor lamps with the addition of cadmium have been described (DE 2 032 615) in which cadmium functions as a buffer material and is intended to contribute to the stabilization of the lamp parameters. Additions of cadmium, thallium, zinc, lead, tin and bismuth have been disclosed (DE 2 707 203) in order to reduce the mercury content in high-pressure sodium vapor lamps in the interest of reducing environmental harm and providing improved resistance of the filler substances to air. Another possibility for exercising a controlled influence on the color properties of high-pressure sodium vapor lamps involves using a time-modulated energy input that is different from operation at power mains frequencies. In this case the energy is fed to the lamp in the form of pulses, while the average power and hence the temperature of the discharge vessel are not raised, although the current level in the pulse is definitely above the levels otherwise commonly used. The lamp power input via the pulses over the total amount of time ($\overline{N}$) and the power converted during the pulses ($\hat{N}$) are related by the duty cycle ($\Delta$) according to the equation $\overline{N}=\tau \cdot \hat{N}$, and the product of the pulse length (t) times the pulse series frequency (f) gives: $\tau = g \cdot t$. A high-pressure sodium vapor lamp operated by this method has been described in the patent literature (U.S. Pat. No. 4,137,484, DE 2 657 824), f having been varied between 500 and 2000 Hz and $\tau$ between 0.1 and 0.3. In this manner it was possible, by the excitation of a correspondingly higher electronic level of the sodium and of the mercury usually serving as buffer gas, to raise the color temperature from 2300 to 2600° K. These values are still too low for the use of such light sources in interior lighting, especially residential lighting, since here color temperatures of 3000° K. and more are desirable. Furthermore, the experiments showed that the visual efficiency of lamps operated in this manner diminishes below a certain duty cycle value at a given pulse series frequency. For example, the light yield of the 150-watt lamp described in patent DE 2 657 824 decreases for color temperatures above 2700° K. to below the level achievable by operation at the mains frequency (by about 5 lm/W for each increase of 120° K. in the color temperature), so that pulsed operation of such lamps is unfavorable in this range. The same conclusion has been reached by other authors (N. Brates, E.F. Wyner: Pulsed Operation of a High Pressure Sodium Lamp; J. Illum. Eng. Soc., New York 16 (1987) 50), who have performed similar studies on conventional 100-watt lamps, though for more or less randomly selected operating conditions ($\tau=0.015$, f=150 Hz). The results of these experiments confirm the not-unexpected increase in color temperature for the chosen duty cycle (during the pulse, $T_c$ levels no higher than 4300° K. are achieved), but in time averaging they show only moderate improvements of the color properties, while the light yield does not achieve the levels achieved in the conventional mode of operation at any time during the discharge. The fact that the time-averaged levels of $T_c$ and $R_a$ could be improved only slightly in comparison with the steady state is due to the relatively high energy transformation between the pulses, which amounted in the present case to about 50% of the total energy input. In this manner the plasma's emission is of low effectiveness over relatively long periods, so that the effect at which the pulsed input is aimed is jeopardized.

Since the direct pulse supply is provided, for example, by connecting charge capacitors, certain time-/power events result from the capacitor discharge curves, plasma characteristics, plasma dynamic and electrode factors, which sometimes depart considerably from any form that is desirable from the viewpoint of plasma physics and illumination technology.

A modified variation of pulsed input is discussed in DE-OS 3636901 and DE-OS 3641070. Here, a high-frequency current of 20 to 50 kHz, for example, is superimposed upon bipolar current pulses with a scan ratio of 0.2 to 0.6. This superimposition is intended to reduce the flicker observed in pulse-driven high-pressure lamps without exercising any direct influence on the illumination data. At a duty cycle of 0.3, the color temperature for 30-watt lamps is 2700° K. in this case.

Operation of high-pressure sodium vapor lamps containing at least one other metal vapor in addition to sodium with unipolar pulses of 50 to 23000 Hz and with a duty cycle between 0.08 and 0.8 has also been disclosed for the purpose of preventing separation phenomena due to cataphoresis (DE 2 729 052).

It has generally been assumed that the known methods for improving the color properties of high-pressure sodium vapor lamps result in more or less great losses in the light yield. The reasons for this situation lie in an increased self-absorption of the resonance lines to the extent that the color improvement is achieved by increasing the sodium partial pressure or, as in the case of the pulsed high-pressure lamp, in a redistribution of the energy to radiation processes with a low illumination efficiency. On the other hand, however, precisely the spectral distribution and hence the light yield are optimized by the technically achieved plasma state and by the luminous system used. The operating regime proposed in DE patent 2 657 824 in connection with the pulsed operation of high-pressure sodium vapor lamps only partially takes this into consideration and therefore results in light-yield losses at higher color temperatures.

OBJECT OF THE INVENTION

It is the object of the invention to provide a high-pressure sodium vapor lamp which will have a high light yield and long useful life combined with good color rendering properties and a most-uniform color temperature ranging from 3000 to 4000° K.

SUMMARY OF THE INVENTION

The invention is directed to a solution of and change "developing" to the problem of providing a light source which will be capable of emitting considerable amounts of radiation close to the maximum sensitivity of the eye, and thus will have a high light yield, and whose overall light distribution will permit color temperatures of 3000 to 4000° K. This problem is solved in accordance with the invention by operating an electrical discharge in sodium vapor in a translucent arc tube to which additional substances, such as mercury for example, can be added, while the sodium molar fraction, unlike the otherwise conventional lamp fills of less than 0.9, is:

$$X_{Na} = \frac{1}{1 + 23/200.6 \; m_{Hg}/m_{Na}}$$

In the equation for $x_{na}$, $m_{Hg}$ and $m_{Na}$ represent the masses of the mercury and sodium in the amalgam.

The arc is fed with electrical pulses whose power exceeds the total time average by at least fivefold such that the average power and hence the thermal stress of the lamp will not exceed, the level allowable for operation on the mains AC. A duty cycle below 0.1 is suitable for the achievement of the desired radiation properties, the pulse sequence frequency being above the flicker-merging frequency of the human eye. Separation of different arc discharge media by cataphoresis can be prevented by the use of pulses of alternating polarity. To limit the necessary restrike at the start of each additional pulse, the arc can continue to be operated between the pulses at a very low basic power. In this kind of operation it is advantageous if the basic power is provided by a current that is synchronous in polarity with the pulses.

In known scanned high-pressure sodium vapor lamps, the improvements achieved in the color properties are obtained at more or less great losses in the light yield. Surprisingly, this disadvantage does not occur in the lamp in accordance with the invention.

The combination of pulses of duty cycle and substance mixtures with a high sodium content in accordance with the invention leads, in addition to the known elevation of the plasma temperature, to an accompanying increase of the emission in the shortwavelength portion of the visible spectrum, to a relatively great excitation of the sodium 4d level. Since the 569 nm spectral line radiated from this level is radiated without self-reversal, unlike resonance lines, the selection of a high sodium partial pressure, which could, of course, also be achieved in another manner, brings about a further increase in the intensity of radiation, also at the center of the line. The result is a high visual efficiency because under these conditions a considerable part of the radiation is emitted close to the maximum eye sensitivity. Since the elevation of the sodium partial pressure also increases the radiation in the short-wave portion of the visible spectrum, the lamp in accordance with the invention combines high light yields with good color properties. In the interest of a high light yield, however, the duty cycle should not be less than 0.01, since otherwise the plasma temperature becomes too high and an increasing percentage of the electrical energy is converted to less effective radiation processes.

For optimum lamp operation it is important that a certain time system be created in the shape of the pulse. The pulse shaping of the invention has
1. Rapid transition from the cooling pause to the state of a given pulse power.
2. Extended time of action of this pulse power that is then adapted.
3. Rapid return to the state of the cooling pause.

Arc tubes filled with different substances were tested in operation on electrical pulses. At the same time the momentary power with respect to the level in steady-state operation was increased step by step to more than 100 times that momentary power level. While color temperatures and color rendering indices of sodium filled lamps were easily raised, in some cases with additional additives involved, the light yield at about ten times the power reached a maximum which, surprisingly, is as much as 60% higher than the steady-state level. Then a decrease takes place such that, at an overload of about 100-fold the light yield generally diminishes below the level achieved in steady-state operation. To enable the best phototechnical state to have the greatest possible influence on the total time average and keep the total effect of the more unfavorable states as small as possible, the optimized pulse shaping is therefore to be sought. For the same reason the holding power must be kept as low as possible, since the light yield in this phase is still decidedly below the levels common in normal operation. Since electronic control of the power with active components such as transistors involves additional heat losses in the input apparatus, multiple delay lines are used which consist of capacitors and inductances to achieve an approximately rectangular pulse shape. Thus, if the matching is suitable, the charging voltage of the capacitors which is available for gating the plasma will be twice as high as the lamp burning voltage that is forming, so that a more rapid transition to the second phase is achieved. Then a matched power plateau is formed, followed by a rapid decay. The pulse shaping that can thus be achieved permits, in addition to technical advantages, a reduction of the peak current intensities, thereby reducing the demands on the electronic components in the input apparatus and, in the interest of long useful life, the stress on the lamp electrodes.

The color rendering properties of the lamp in accordance with the invention can be further improved by adding caesium and/or rubidium to the discharge medium. In pulsed operation these elements emit a strong continuum which boosts the sodium radiation on the short-wavelength, end of the visible spectrum. Further improvements for achieving the most uniform color temperatures can be obtained by additions of cadmium and/or zinc. As a result of the higher plasma temperatures due to the pulsed operation of the lamp, the spectral lines 468, 480, 509 and 644 nm of cadmium as well as 468, 472, 481 and 636 nm of zinc are brought to emission. They bring about an increase in the color rendering index and, since they are mainly in the short-wavelength portion of the visible spectral range, they cause an additional raising of the most uniform color temperature of the lamp.

BRIEF DESCRIPTION OF THE DRAWINGS

In order that the invention may be more clearly understood, it will now be disclosed in greater detail with reference to the accompanying drawings, wherein.

DETAILED DISCLOSURE OF THE INVENTION

Figure 1:
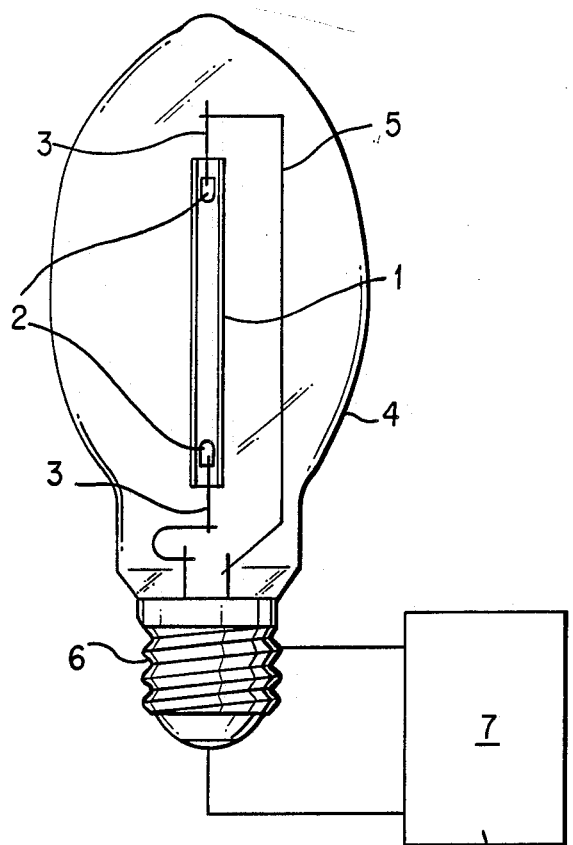
FIG. 1 is an illustration of a lamp system in accordance with the invention.

The invention will now be explained by the discussion of 3 embodiments, in each of which, a cylindrical arc tube 1 illustrated in FIG. 1 was used. The tube was made of translucent sintered aluminum oxide, having an inside diameter of 3.5 mm, with two electrodes 2 situated opposite one another and spaced a distance of 36 mm. Electrical conductors 3 passed through vacuum-tight cement seals. The arc tube is surrounded by an evacuated outer bulb 4, in which support 5 provides the mechanical mounting and the electrical connection with the base 6. The arc tube, support, outer bulb and base together form an arc lamp which is supplied by the power supply 7. To form the pulses, multiple delay lines, consisting of inductances and capacitors are used, which have resistance networks matched to the arc plasma.

EXAMPLE 1

The arc tube is filled with 3 mg sodium, 2 mg mercury, 0.5 mg caesium and 30 kPa xenon. 1000 current pulses per second, with a duty cycle of 0.05 and alternating polarity, are fed to the lamp. These pulses are superimposed in-phase upon a basic supply voltage in the form of a 1 kHz square wave current of 0.1 A. The lamp thus operated on an average power input of 70 W emits a luminous flux of 5.3 klm. Its color temperature is 3600° K. and its general color rendition index is 70.

EXAMPLE 2

Figure 2:
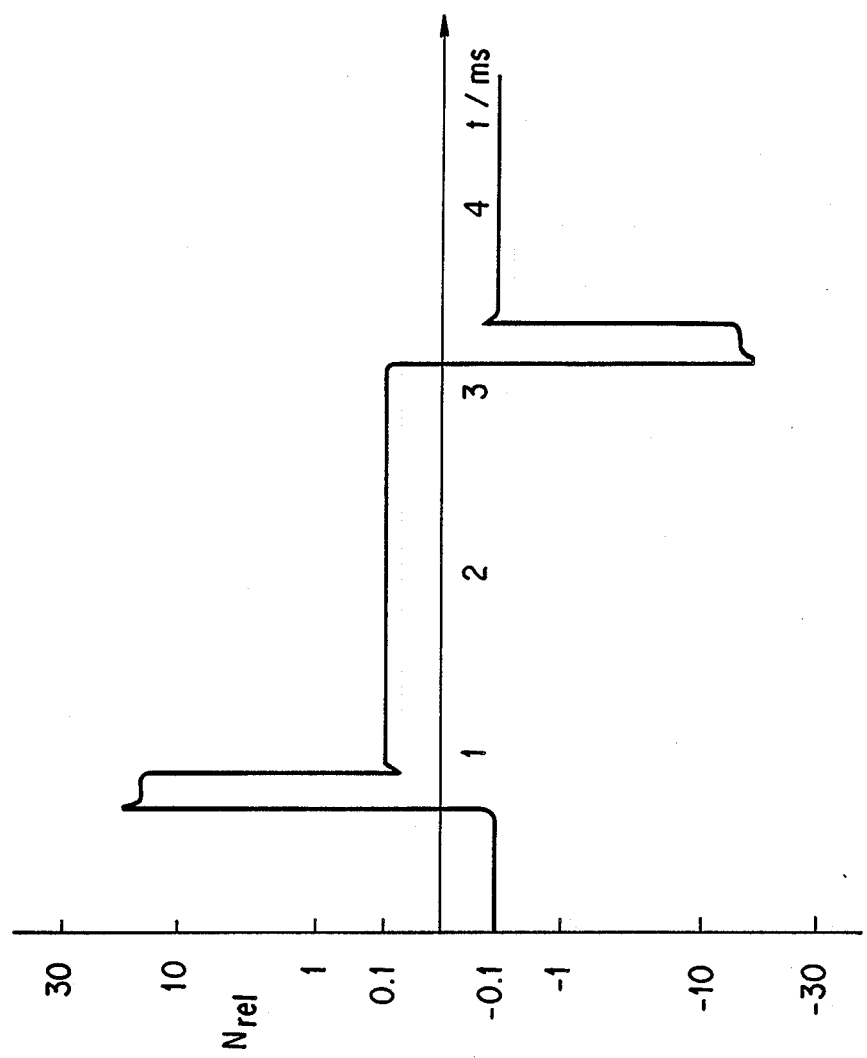
FIG. 2 is a time diagram showing the output of the second example.

The arc tube is filled with 3.5 mg sodium and 2 mg mercury ($X_{na}=0.94$) and xenon at a cold charge pressure of 6kPa. The lamp is fed with 400 current pulses per second with a duty cycle of 0.08 and alternating polarity. The delay line has three equal circuits of 68 $\mu$ inductances and 4 $\mu$F capacitances each. These pulses are superimposed on a basic supply voltage in the form of a 200 Hz square wave alternating current of 0.1 A, in-phase. FIG. 2 shows the curve of the lamp output $N_{rel}$ in relation to time t in comparison to the value at steady-state operation. The high-pressure sodium vapor lamp operated on high-power pulses in this manner emits a luminous flux of 6 klm at an average power input of 70 watts. Its color temperature is 3200° K. and its general color rendering index is 45.

EXAMPLE 3

The arc tube is filled with 2.4 mg of sodium ($x_{Na}=1$) and xenon at a cold charge pressure of 30 kPa. The lamp is supplied with 200 current pulses per second with a duty cycle of 0.02 and uniform polarity. Between the pulses a basic power supply voltage is provided in the form of a holding current with an effective value of 0.1 A. The lamp thus operated, at an average power input of 70 watts, emits a luminous flux of 4.5 klm. Its color temperature is 3500° K. and its general color rendering index is 55.

We claim:

1. In a high-pressure sodium vapor lamp system comprised of a translucent heat-resistant arc tube filled with an arc medium, and a power supply connected to the arc lamp for supplying thereto pulses having a frequency of at least 100 Hz, the improvement wherein said arc medium comprised sodium with a mole fraction of $x_{Na}>0.9$ as the chief arc medium, and said power supply comprises means for applying pulses to said lamp having a power that exceeds the total time average by at least fivefold, with a time interval of nor more than 10 ms and a duty cycle $\tau$ of $0.01<\tau<0.1$ with alternating polarity.

2. The high-pressure sodium vapor lamp system of claim 1 wherein said power supply comprises means for forming said pulses to have a rapid transition from a cooling phase to a state of a predetermined pulse power followed by an extended time of pulse power matched to said lamp, and concluded by a rapid return to a state of a cooling phase.

3. The high-pressure sodium vapor lamp system of claim 1 where said power supply comprises a multiple time-delay network of capacitors and inductors for forming said pulses.

4. The high-pressure sodium vapor lamp system of claim 1 wherein said arc medium additionally comprises a vapor of a heavy alkali metal of the group consisting of caesium and/or rubidium.

5. The high-pressure sodium vapor lamp system of claim 1 wherein said arc medium additionally comprises a vapor of a metal of the group consisting of cadmium and/or zinc.

6. The high-pressure sodium vapor lamp system of claim 1 wherein said arc medium additionally comprises a noble gas.

7. The high-pressure sodium vapor lamp system of claim 6 wherein said noble gas is xenon.

8. The high-pressure sodium vapor lamp system of claim 1 wherein said power supply comprises means providing a holding current of low intensity to said lamp for sustaining the discharge in the lamp during the time between pulses.

9. The high-pressure sodium vapor lamp system of claim 1 wherein said power supply comprises means providing a holding current of low intensity to said lamp for sustaining the discharge in the lamp during the time between pulses.

10. In a high-pressure sodium vapor lamp system comprised of a translucent heat-resistant arc tube filled with an arc medium, and a power supply connected to the arc lamp for supplying thereto pulses having a frequency of at least 100 Hz, the improvement wherein said arc medium comprises a sodium amalgam with a mole fraction of $x_{Na} > 0.95$ as the chief arc medium, and said power supply comprises means for applying pulses to said lamp having a power than exceeds the total time average by at least fivefold, with a time interval of no more than 10 ms and a duty cycle $\tau$ of $0.01 < \tau < 0.1$ with uniform polarity.

11. The high-pressure sodium vapor lamp system of claim 10 wherein said power supply comprises means for forming said pulses to have a rapid transition from a cooling phase to a state of a predetermined pulse power followed by an extended time of pulse power matched to said lamp, and concluded by a rapid return to a state of a cooling phase.

12. The high-pressure sodium vapor lamp system of claim 10 where said power supply comprises a multiple time-delay network of capacitors and inductors for forming said pulses.

13. The high-pressure sodium vapor lamp system of claim 10 wherein said arc medium additionally comprises a vapor of a heavy alkali metal of the group consisting of caesium and/or rubidium.

14. The high-pressure sodium vapor lamp system of claim 10 wherein said arc medium additionally comprises a vapor of a metal of the group consisting of cadmium and/or zinc.

15. The high-pressure sodium vapor lamp system of claim 10 wherein said arc medium additionally comprises a noble gas.

16. The high-pressure sodium vapor lamp system of claim 15 wherein said noble gas is xenon.

* * * * *